United States Patent
Zhu et al.

(10) Patent No.: US 11,958,781 B2
(45) Date of Patent: Apr. 16, 2024

(54) POTASSIUM SODIUM BISMUTH NIOBATE TANTALATE ZIRCONATE FERRITE CERAMICS WITH NON-STOICHIOMETRIC $Nb^{5+}$ AND PREPARATION METHOD THEREFOR

(71) Applicant: Sichuan University, Chengdu (CN)

(72) Inventors: Jianguo Zhu, Sichuan (CN); Hongjiang Li, Sichuan (CN); Jie Xing, Sichuan (CN); Zhi Tan, Sichuan (CN); Lixu Xie, Sichuan (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 18/451,087

(22) Filed: Aug. 16, 2023

(65) Prior Publication Data

US 2024/0067572 A1   Feb. 29, 2024

(30) Foreign Application Priority Data

Aug. 27, 2022 (CN) .......................... 202211035937.3

(51) Int. Cl.
*C04B 35/495* (2006.01)
*C04B 35/626* (2006.01)
*C04B 35/628* (2006.01)

(52) U.S. Cl.
CPC ........ *C04B 35/495* (2013.01); *C04B 35/6261* (2013.01); *C04B 35/62675* (2013.01); *C04B 35/62876* (2013.01); *C04B 2235/5463* (2013.01); *C04B 2235/96* (2013.01)

(58) Field of Classification Search
CPC ...... C04B 35/495; C04B 35/26; H10N 30/853
See application file for complete search history.

(56) References Cited

U.S. PATENT DOCUMENTS 7,303,828 B2 * 12/2007 Kijima ....................... C30B 5/00
                                                          257/E21.272
2004/0241501 A1 * 12/2004 Kijima .............. H01L 21/02197
                                                          257/E21.272

FOREIGN PATENT DOCUMENTS

| CN | 1958511 A | 5/2007 |
|---|---|---|
| CN | 104051606 A | 9/2014 |
| CN | 104576916 A | 4/2015 |
| CN | 111908917 A | 11/2020 |
| CN | 113213930 A | 8/2021 |
| DE | 102012106743 A1 | 7/2013 |
| EP | 1253121 A2 | 10/2002 |
| JP | 2007031219 A | 2/2007 |
| WO | 02053514 A1 | 7/2002 |

OTHER PUBLICATIONS

Bo Wu, "Modification of both d33 and TC in a potassium-sodium niobate ternary system" The Royal Society of Chemistry ,(Dec. 31, 2015), vol. 44, p. 21141-21152, Claims 1-10.

Xiong Peng, "Research on Hydrothermal Synthesis of Niobate Powder and Doped Modified Piezoelectric Ceramics Performance" Chinese Excellent Master's Thesis Full Text Database Engineering Science and Technology vol. I ,,(Dec. 15, 2013), Undefined period, p. B015-167, Claims 1-10.

Jie Xing, "Properties and structures of nonstoichiometric (K, Na)NbO3-based lead-free ceramics" Journal of the American ceramic Society (Mar. 20, 2017), vol. 44, p. 1633-1645, Claims 1-10.

* cited by examiner

Primary Examiner — Elizabeth A. Bolden

(57) ABSTRACT

The present invention discloses potassium sodium bismuth niobate tantalate zirconate ferrite ceramics with non-stoichiometric $Nb^{5+}$ and a preparation method therefor. A ceramic powder with a general formula of $(K_{0.45936}Na_{0.51764}Bi_{0.023})(Nb_{0.89958+0.957x}Ta_{0.05742}Zr_{0.04}Fe_{0.003})O_3$ ($-0.01 \leq x \leq 0.04$) is prepared by a traditional solid phase method; and then piezoelectric ceramics are prepared by traditional electronic ceramic preparation processes such as granulating, molding, binder removal, sintering and silvering test. An excessive amount of $Nb^{5+}$ doping improves the temperature stability of the ceramics by providing a domain wall pinning effect. This result demonstrates the promise of potassium sodium bismuth niobate tantalate zirconate ferrite ceramics for a wide range of applications, including sensors, actuators, and other electronic devices.

8 Claims, 5 Drawing Sheets

POTASSIUM SODIUM BISMUTH NIOBATE TANTALATE ZIRCONATE FERRITE CERAMICS WITH NON-STOICHIOMETRIC $Nb^{5+}$ AND PREPARATION METHOD THEREFOR

CROSS-REFERENCE TO RELATED APPLICATIONS

This application claims priority of Chinese Patent Application No. 202211035937.3, filed on Aug. 27, 2022, the entire contents of which are incorporated herein by reference.

TECHNICAL FIELD

The present invention relates to the technical field of lead-free piezoelectric ceramics, and more particularly to potassium sodium bismuth niobate tantalate zirconate ferrite ceramics with non-stoichiometric $Nb^{5+}$ and a preparation method therefor.

BACKGROUND

At present, lead zirconate titanate (PZT) based ceramics systems are widely studied for various applications, such as sensors, actuators and other electronic devices, but the use of lead-based ceramics is harmful to human health and environment. Therefore, the use of environmentally friendly lead-free ceramics in piezoelectric devices is becoming more and more demanding. Among the numerous lead-free candidate materials, potassium sodium niobate (KNN) based ceramics have attracted much attention due to the large piezoelectric coefficient ($d_{33}$), high Curie temperature ($T_C$) and environmental friendliness thereof. To obtain high-performance KNN-based ceramics which can replace lead-based ceramics, the piezoelectric properties, strain properties and temperature stability of KNN-based ceramics have been studied extensively. In recent years, certain progresses have been made in the research of piezoelectric materials, and the corresponding mechanisms of piezoelectric materials have been discussed. However, the problems of comprehensive electrical properties of KNN-based ceramics have not been well solved. For example, KNN-based ceramics with a high piezoelectric constant $d_{33}$ is often obtained at a low $T_C$ condition, the temperature stability thereof is poor, and such results are not sufficient for practical applications. Therefore, researchers have been working on improving the comprehensive electrical properties of KNN-based ceramics.

To better understand the doping mechanism, it is necessary to deeply study the local structures at an atomic level, which is crucial to improving the functional properties of lead-free piezoelectric ceramics. The piezoelectric and dielectric properties of KNN-based ceramics are affected by the substitution of A or B cations in a perovskite structure ($ABO_3$), thus affecting the polycrystalline phase transition, grain structure, ferroelectric domain structure and ferroelectric properties. The present invention finds that the relationship between non-stoichiometric doping at B-site and polycrystalline phase transition behavior, microstructure, ferroelectric properties, piezoelectric properties and dielectric properties has hardly been reported. Moderate or excessive amount of B-site non-stoichiometric doping can improve the crystallinity of ceramics, which can be attributed to the creation of vacancies at A-site, thus enhancing the diffusion of ions during sintering.

It is well known that the piezoelectric and dielectric properties of KNN-based ceramics with a polycrystalline phase boundary structure are highly dependent on temperature. Therefore, high $d_{33}$ and electromechanical coupling factor ($k_p$) values are always at the expense of reducing $T_C$ of the ceramics. How to overcome the contradiction between large $d_{33}$ and $k_p$ values and high $T_C$ has become a hot issue. The present invention finds that B-site non-stoichiometric $Nb^{5+}$ doping KNN-based ceramics can obtain a large $d_{33}$ value while maintaining a high $T_C$. In addition, the introduction of B-site non-stoichiometry leads to the presence of defect dipoles and a domain wall pinning effect in the ceramics, which is conducive to improving the temperature stability of $d_{33}$ and the dielectric loss (tan$\delta$). Therefore, more specific studies on the piezoelectric and dielectric properties of B-site non-stoichiometric $Nb^{5+}$ doping KNN-based ceramics are worth carrying out.

SUMMARY

The purpose of the present invention is to provide potassium sodium bismuth niobate tantalate zirconate ferrite ceramics with non-stoichiometric $Nb^{5+}$ and a preparation method therefor, thus to solve the problem of poor comprehensive electrical properties of KNN-based ceramics in the prior art. The present invention provides potassium sodium bismuth niobate tantalate zirconate ferrite ceramics with excellent comprehensive electrical properties by the method of doping non-stoichiometric $Nb^{5+}$ into the B-site of KNN-based ceramics.

To achieve the above purpose, the present invention provides potassium sodium bismuth niobate tantalate zirconate ferrite ceramics with non-stoichiometric $Nb^{5+}$, wherein the ceramics have the following general formula:

$$(K_{0.45936}Na_{0.51764}Bi_{0.023})(Nb_{0.59958+0.957x}Ta_{0.05742}Zr_{0.04}Fe_{0.003})O_3,$$

wherein $-0.01 \leq x \leq 0.04$.

Preferably, the piezoelectric properties of the ceramics are that: the piezoelectric constant $d_{33}$ is 300-450 pC/N, the Curie temperature $T_C$ is 300-305° C., the electromechanical coupling factor $k_p$ is 0.385-0.516, the dielectric constant $\varepsilon_r$ is 1400-1644, and the dielectric loss tan$\delta$ is 0.024-0.038.

Preferably, x is 0.01.

Preferably, the piezoelectric properties of the ceramics are that: the piezoelectric constant $d_{33}$ is 450 pC/N, the Curie temperature $T_C$ is 300° C., the electromechanical coupling factor $k_p$ is 0.516, the dielectric constant $\varepsilon_r$ is 1644, and the dielectric loss tan$\delta$ is 0.024.

A preparation method for the potassium sodium bismuth niobate tantalate zirconate ferrite ceramics with non-stoichiometric $Nb^{5+}$, comprising the following steps:

(1) Preparing the Potassium Sodium Bismuth Niobate Tantalate Zirconate Ferrite Ceramic Powder by a Traditional Solid Phase Method Weighing and proportioning raw materials respectively according to the general formula, placing the raw materials in a polyurethane ball milling pot and adding a dispersion medium, placing the raw materials in a planetary ball mill, conducting ball milling until the raw materials are mixed uniformly, placing the uniformly mixed slurry in a stainless steel basin, baking the slurry under a drying lamp to obtain a dried powder, putting the dried powder into a crucible, raising the temperature in a programmed temperature control box furnace to 850° C.-950° C., and pre-sintering the dried powder for 6 hours to obtain a pre-sintered powder;

(2) Secondary Ball Milling

Placing the Pre-Sintered Powder Prepared in Step (1) in the Polyurethane Ball Milling pot and adding the dispersion medium again, placing in a planetary ball mill and conducting secondary ball milling, and baking the slurry under a drying lamp to obtain a dried ceramic powder;

(3) Granulating and Molding

Fully mixing the dried ceramic powder prepared in step (2) with a 5-10 wt % PVA binder, conducting granulating to form uniformly distributed particles, and pressing the particles into preformed ceramic green pellets with a diameter of 10 mm and a thickness of 1 mm under a uniaxial pressure of 10-15 MPa;

(4) Binder Removal and Sintering

Removing binder of the preformed ceramic green pellets prepared in step (3) at a temperature of 500° C.-550° C., and sintering the ceramic green pellets at a temperature of 1090° C.-1120° C. for 3-5 hours to prepare sintered ceramic pellets;

(5) Silvering and Polarization

Brushing the sintered ceramic pellets with a silver paste with a concentration of 5-15 wt %, sintering the ceramic pellets again at 700° C.-800° C. for 10-15 minutes to prepare a sample, and conducting polarization in an oil bath at a temperature between room temperature and 120° C. to prepare piezoelectric ceramics.

Preferably, the raw material of each element doped in step (1) is an oxide or carbonate thereof.

Preferably, during the ball milling in step (1) and step (2), the ratio of powder to zirconium balls is 1:2-3, the ratio of powder to dispersion medium is 1:2-3, the dispersion medium is absolute ethyl alcohol, the ball milling time is 15-20 hours, the rotational speed is 250-320 r/min, and the baking time is 2-3 hours.

Preferably, the particle size distribution after the ball milling in step (1) is D50=0.7-0.8 μm, D90=1.7-1.8 m, and D97=2.2-2.4 μm.

Preferably, the particle size distribution after the ball milling in step (2) is D50=0.3-0.4 μm, D90=0.7-0.8 m, and D97=1.2-1.5 μm.

Preferably, during the polarization in step (5), the polarization voltage is gradually increased from a low voltage to a predetermined polarization voltage, the polarization field strength is 3-4 kV/mm, and the voltage holding time is 10-15 minutes.

An application of the potassium sodium bismuth niobate tantalate zirconate ferrite ceramics with non-stoichiometric $Nb^{5+}$, wherein the ceramics are used as lead-free piezoelectric ceramics.

Therefore, the potassium sodium bismuth niobate tantalate zirconate ferrite ceramics with non-stoichiometric $Nb^{5+}$ and the preparation method therefor of the present invention using the above structure have the following beneficial effects:

1. The comprehensive electrical properties of the potassium sodium bismuth niobate tantalate zirconate ferrite ceramics are optimized by non-stoichiometric $Nb^{5+}$, and when x is 0.01, the piezoelectric properties of the ceramics are that: the piezoelectric constant $d_{33}$ is 450 pC/N, the Curie temperature $T_C$ is 300° C., the electromechanical coupling factor $k_p$ is 0.516, the dielectric constant $\varepsilon_r$ is 1644, and the dielectric loss tanδ is 0.024;
2. The introduction of an excessive amount of $Nb^{5+}$ leads to the presence of defect dipoles and a domain wall pinning effect, which is conducive to improving the temperature stability of the piezoelectric properties of the potassium sodium bismuth niobate tantalate zirconate ferrite ceramics; the piezoelectric coefficient, the electromechanical coupling factor, and the dielectric constant of the ceramics are increased, the dielectric loss is reduced, and thus the comprehensive electrical properties of the ceramics are improved in the condition of keeping the Curie temperature unchanged.

The technical solution of the present invention is further described in detail below by the accompanying drawings and embodiments.

DETAILED DESCRIPTION

Figure 1:
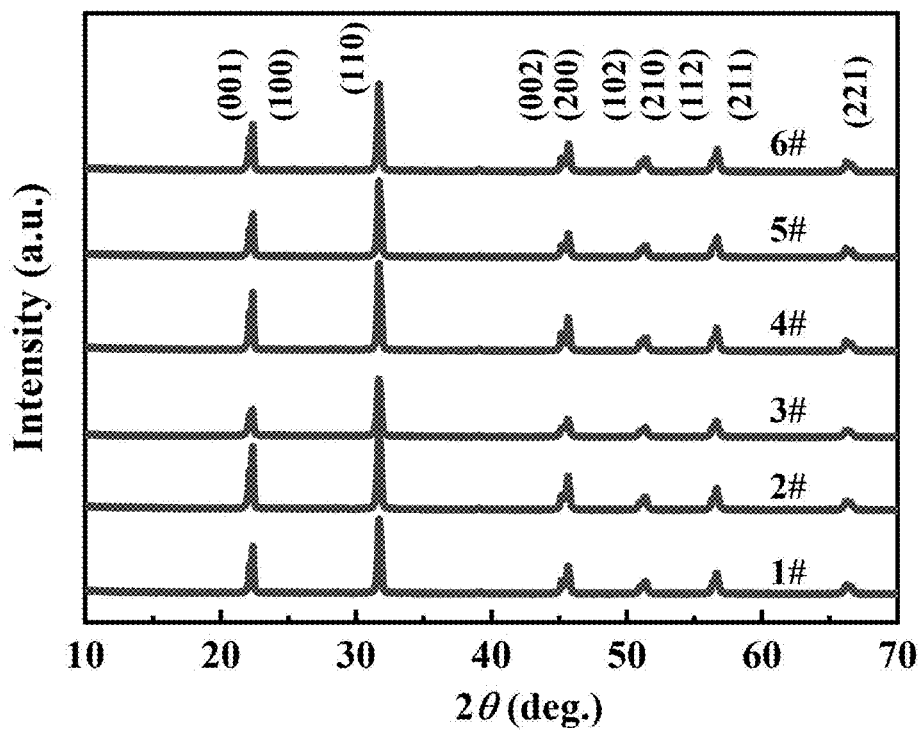
FIG. 1 shows X-ray diffraction (XRD) patterns of potassium sodium bismuth niobate tantalate zirconate ferrite ceramics with different contents of $Nb^{5+}$.

The present invention is further described in detail below. It should be noted that detailed implementation modes and specific operation procedures are given by the embodiments on the premise of the present invention, but the present invention is not limited to the embodiments.

Embodiment 1

A preparation method for the potassium sodium bismuth niobate tantalate zirconate ferrite ceramics with non-stoichiometric $Nb^{5+}$, comprising the following steps:

(1) Preparing the Potassium Sodium Bismuth Niobate Tantalate Zirconate Ferrite Ceramic Powder by a Traditional Solid Phase Method Weighing and proportioning raw materials respectively according to the general formulas: $(K_{0.45936}Na_{0.51764}Bi_{0.023})(Nb_{0.59001}Ta_{0.05742}Zr_{0.04}Fe_{0.003})O_3$ (x=−0.01, numbered as 1#), $(K_{0.45936}Na_{0.51764}Bi_{0.023})(Nb_{0.59958}Ta_{0.05742}Zr_{0.04}Fe_{0.003})O_3$ (x=0.00, numbered as 2#), $(K_{0.45936}Na_{0.51764}Bi_{0.023})(Nb_{0.90915}Ta_{0.05742}Zr_{0.04}Fe_{0.003})O_3$ (x=0.01, numbered as 3#), $(K_{0.45936}Na_{0.51764}Bi_{0.023})$ $(Nb_{0.91872}Ta_{0.05742}Zr_{0.04}Fe_{0.003})O_3$ (x=0.02, numbered as $4^\#$), $(K_{0.45936}Na_{0.51764}Bi_{0.023})$ $(Nb_{0.92829}Ta_{0.05742}Zr_{0.04}Fe_{0.003})O_3$ (x=0.03, numbered as $5^\#$), and $(K_{0.45936}Na_{0.51764}Bi_{0.023})$ $(Nb_{0.93786}Ta_{0.05742}Zr_{0.04}Fe_{0.003})O_3$ (x=0.04, numbered as $6^\#$), placing the raw materials in a polyurethane ball milling pot (powder:zirconium balls=1:2-3), using absolute ethyl alcohol as a dispersion medium (powder:absolute ethyl alcohol=1:2-3), placing the raw materials in a planetary ball mill and conducting ball milling for 15-20 hours (the rotational speed is 250-320 r/min), placing the uniformly mixed slurry in a stainless steel basin, baking the slurry under a drying lamp for 2-3 hours, putting the dried powder into a crucible, raising the temperature in a programmed temperature control box furnace to 900° C., and pre-sintering the dried powder for 6 hours to obtained preformed powders of $1^\#$, $2^\#$, $3^\#$, $4^\#$, $5^\#$, and $6^\#$ $(K_{0.45936}Na_{0.51764}Bi_{0.023})$ $(Nb_{0.89958s+0.957x}Ta_{0.05742}Zr_{0.04}Fe_{0.003})O_3$.

(2) Secondary Ball Milling

Placing the preformed powders of $1^\#$, $2^\#$, $3^\#$, $4^\#$, $5^\#$, and $6^\#$ $(K_{0.45936}Na_{0.51764}Bi_{0.023})$ $(Nb_{0.89958+0.957x}Ta_{0.05742}Zr_{0.04}Fe_{0.003})O_3$ in a polyurethane ball milling pot and conducting secondary ball milling (powder:zirconium balls=1:2-3), using absolute ethyl alcohol as a dispersion medium (powder:solvent=1:2-3), placing in a planetary ball mill and conducting ball milling for 15-20 hours (the rotational speed is 250-320 r/min), and baking the slurry under a drying lamp for 2-3 hours to obtained a ceramic powder. As tested by a laser particle size analyzer, the particle size distribution after the ball milling is D50=0.3-0.4 μm, D90=0.7-0.8 μm, and D97=1.2-1.5 μm.

(3) Granulating and Molding

Fully mixing the dried ceramic powder with an 8 wt % PVA binder, conducting granulating to form uniformly distributed particles, and pressing the particles into preformed ceramic green pellets of $1^\#$, $2^\#$, $3^\#$, $4^\#$, $5^\#$, and $6^\#$ $(K_{0.45936}Na_{0.51764}Bi_{0.023})$ $(Nb_{0.9958+0.957x}Ta_{0.05742}Zr_{0.04}Fe_{0.003})O_3$ with a diameter of 10 mm and a thickness of 1 mm under a uniaxial pressure of 10-15 MPa.

(4) Binder Removal and Sintering

Removing binder of the preformed ceramic green pellets of $1^\#$, $2^\#$, $3^\#$, $4^\#$, $5^\#$, and $6^\#$ $(K_{0.45936}Na_{0.51764}Bi_{0.023})$ $(Nb_{0.89958+0.957x}Ta_{0.05742}Zr_{0.04}Fe_{0.003})O_3$ at a temperature of 520° C., and sintering the ceramic green pellets at a temperature of 1100° C. for 4 hours to prepare sintered ceramic pellets of $1^\#$, $2^\#$, $3^\#$, $4^\#$, $5^\#$, and $6^\#$ $(K_{0.45936}Na_{0.51764}Bi_{0.023})$ $(Nb_{0.89958+0.957x}Ta_{0.05742}Zr_{0.04}Fe_{0.003})O_3$.

(5) Silvering and Polarization

Brushing the sintered ceramic pellets of $1^\#$, $2^\#$, $3^\#$, $4^\#$, $5^\#$, and $6^\#$ $(K_{0.45936}Na_{0.51764}Bi_{0.023})$ $(Nb_{0.89958+0.957x}Ta_{0.05742}Zr_{0.04}Fe_{0.003})O_3$ obtained after the sintering with a silver paste with a concentration of 10 wt %, and sintering the ceramic pellets again at 750° C. for 12 minutes to prepare a sample. After silver sintering, baking the ceramic pellets in a furnace at about 340° C. for about 30 minutes to make preparation for polarization. Conducting polarization in an oil bath at a temperature of 100° C. The polarization voltage is gradually increased from a low voltage to a predetermined polarization voltage, the polarization field strength is 3 kV/mm, and the voltage holding time is 12 minutes to prepare piezoelectric ceramics of $1^\#$, $2^\#$, $3^\#$, $4^\#$, $5^\#$, and $6^\#$ $(K_{0.45936}Na_{0.51764}Bi_{0.023})$ $(Nb_{0.89958+0.957x}Ta_{0.05742}Zr_{0.04}Fe_{0.003})O_3$.

Embodiment 2

The electrical properties of the piezoelectric ceramics of $1^\#$, $2^\#$, $3^\#$, $4^\#$, $5^\#$, and $6^\#$ $(K_{0.45936}Na_{0.51764}Bi_{0.023})$ $(Nb_{0.89958+0.957x}Ta_{0.05742}Zr_{0.04}Fe_{0.003})O_3$ prepared in embodiment 1 are tested and characterized.

After standing at room temperature (25° C.) in an environment with a humidity of 45%-65% RH for 24 hours, various electrical parameters (such as $k_p$, $d_{33}$, $\varepsilon_r$, and tanδ) of the sample are measured by relevant instruments, wherein the test frequency of the dielectric constant and the dielectric loss is 1 kHz. It should be noted that the above test methods are commonly used in the art and will not be repeated herein.

(1) XRD Characterization

Figure 2:
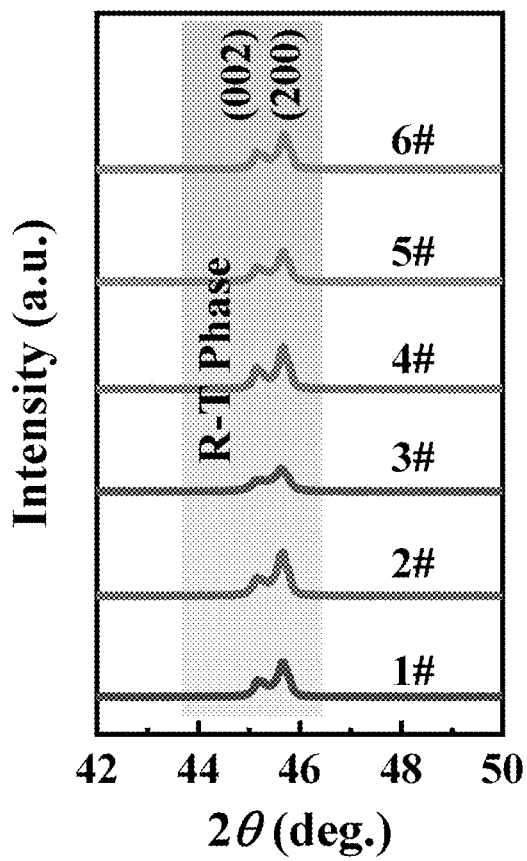
FIG. 2 is an enlarged view of FIG. 1.

FIG. 1 depicts the phase structure and phase purity of the six kinds of $(K_{0.45936}Na_{0.51764}Bi_{0.023})$ $(Nb_{0.89958+0.957x}Ta_{0.05742}Zr_{0.04}Fe_{0.003})O_3$ ceramics, wherein the XRD patterns thereof show that the synthesized KNN-based ceramics have a single perovskite structure, and an excessive amount of $Nb^{5+}$ can enter KNN lattices to form a solid solution. As shown in FIG. 2, to further characterize the phase structure evolution of the ceramics with the increase of $Nb^{5+}$ content, the split peak changes with the increase of $Nb^{5+}$ content.

(2) SEM Characterization

Figure 3:
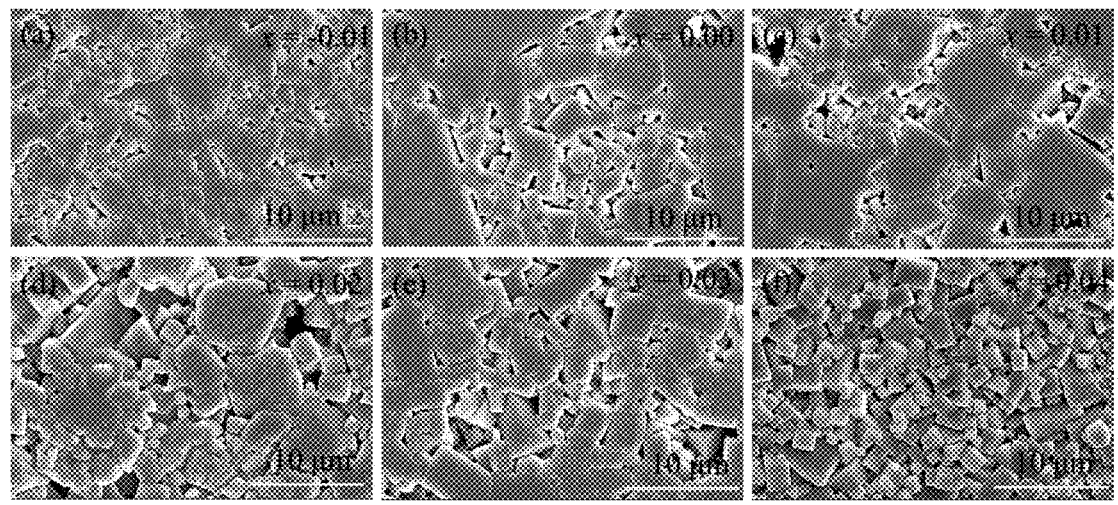
FIG. 3 shows scanning electron microscope (SEM) photographs of potassium sodium bismuth niobate tantalate zirconate ferrite ceramics with different contents of $Nb^{5+}$.

FIG. 3 shows SEM micrographs of polished and heat-etched $(K_{0.45936}Na_{0.51764}Bi_{0.023})$ $(Nb_{0.89958+0.957x}Ta_{0.05742}Zr_{0.04}Fe_{0.003})O_3$ ceramics and shows the random orientations of densely packed cuboid grains. The surface topography of the ceramics shows that large grains are surrounded by small ones, which is the result of abnormal growth, and thereby results in a high bulk density. Non-stoichiometric $Nb^{5+}$ with a proper content can greatly improve the densification and grain growth of the $(K_{0.45936}Na_{0.51764}Bi_{0.023})$ $(Nb_{0.59958+0.957x}Ta_{0.5742}Zr_{0.04}Fe_{0.003})O_3$ ceramics, but an excessive amount of $Nb^{5+}$ is not conducive to the formation of a dense structure.

(3) PFM Characterization

Figure 4:
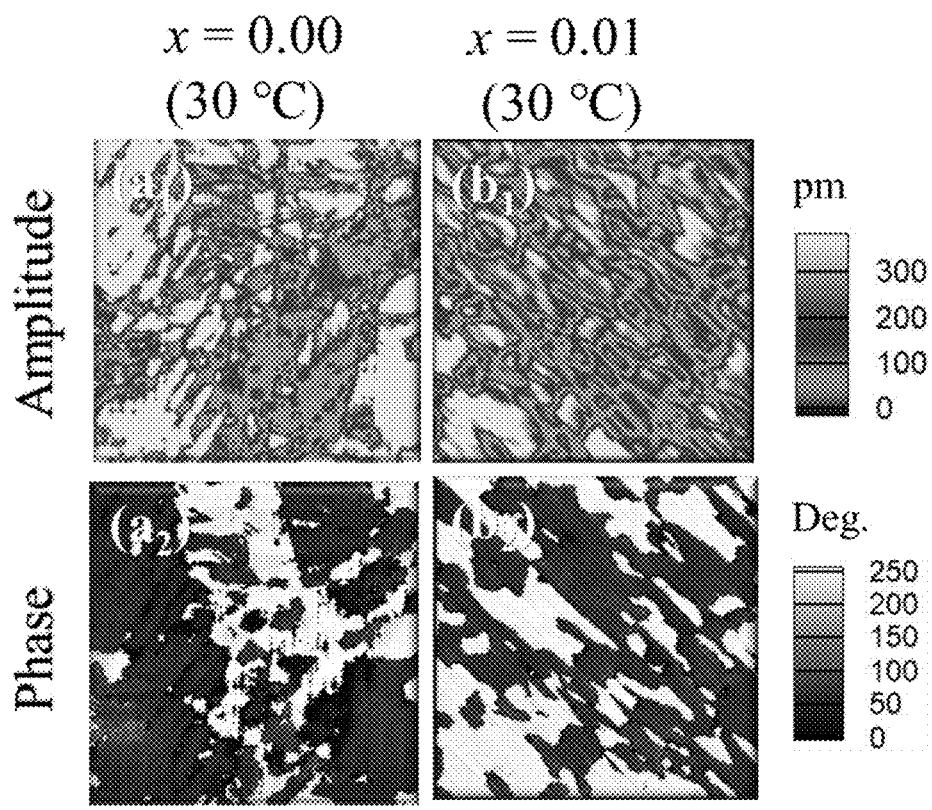
FIG. 4 shows piezoelectric force microscope (PFM) images of potassium sodium bismuth niobate tantalate zirconate ferrite ceramics with different contents of $Nb^{5+}$, and a scanning area is 4×4 μm.

FIG. 4 shows that the nanoscale domains and lamellar domain structure of non-stoichiometric $(K_{0.45936}Na_{0.51764}Bi_{0.023})(Nb_{0.90915}Ta_{0.05742}Zr_{0.04}Fe_{0.003})O_3$ ceramics (x=0.01) exhibit a more dense and uniform distribution than that of ceramics with the stoichiometric $(K_{0.45936}Na_{0.51764}Bi_{0.023})(Nb_{0.89958}Ta_{0.05742}Zr_{0.04}Fe_{0.003})O_3$ ceramics (x=0). Such results indicate that $Nb^{5+}$ with a proper content occupying the B-site can refine the size of polar nanoregions and increase the compactability of the ceramics.

(4) Electrical Property Characterizations

Figure 5:
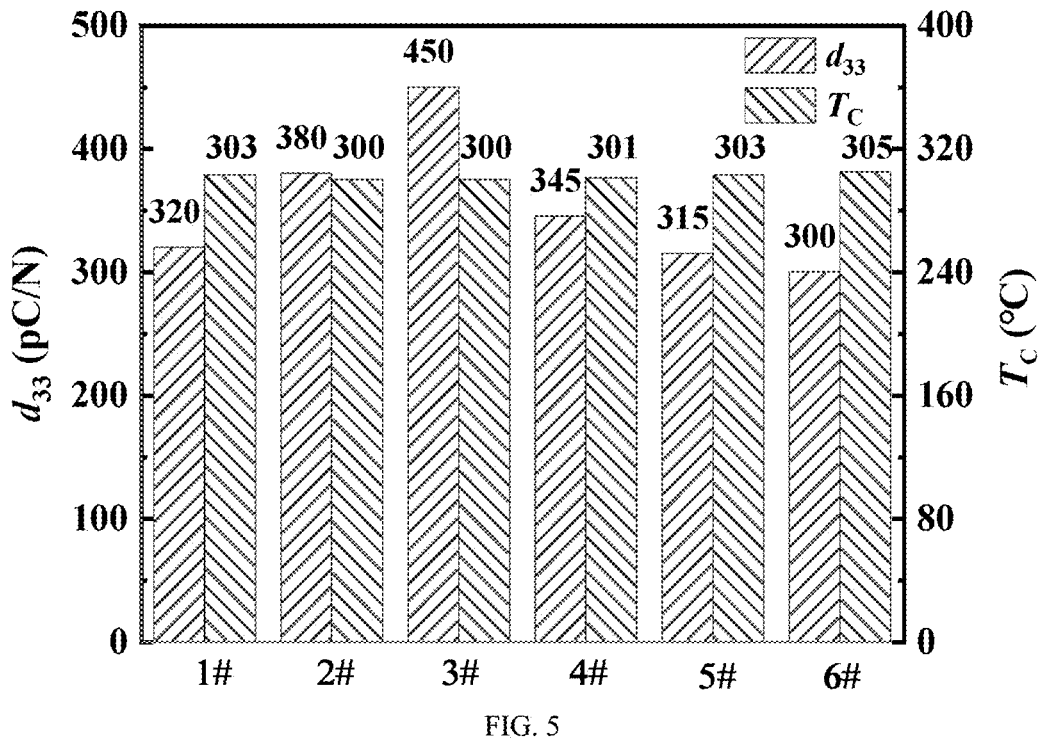
FIG. 5 shows $d_{33}$ and $T_C$ of potassium sodium bismuth niobate tantalate zirconate ferrite ceramics with different contents of $Nb^{5+}$.

FIG. 5 shows $d_{33}$ and $T_C$ of the $(K_{0.45936}Na_{0.51764}Bi_{0.023})$ $(Nb_{0.89958+0.957x}Ta_{0.05742}Zr_{0.04}Fe_{0.003})O_3$ ceramics at different x contents. The $d_{33}$ initially increased followed by a gradual decrease, reaching the maximum value of 450 pC/N at x=0.01. When the addition amount of $Nb^{5+}$ is stoichiometric, the $d_{33}$ value is 380 pC/N. Although the $d_{33}$ value of 450 pC/N can usually be achieved in KNN-based ceramics, it is rarely reported that such a large $d_{33}$ value is achieved at high $T_C$, which indicates that the ceramics prepared by the present invention has a high stability at a high temperature.

Figure 6:
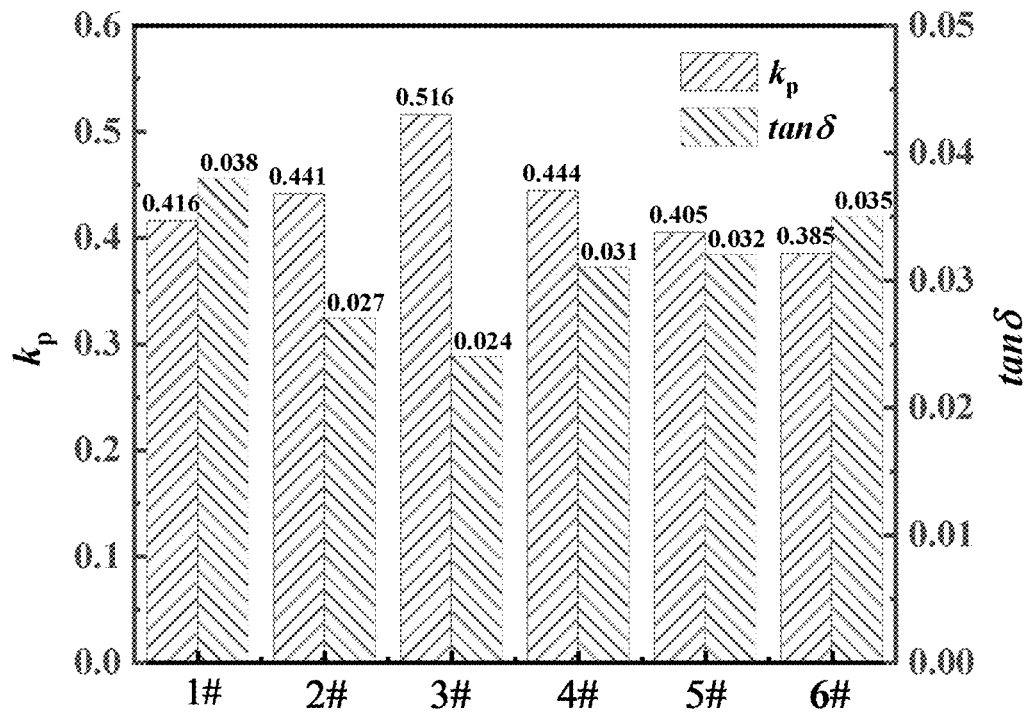
FIG. 6 shows $k_p$ and tanδ of potassium sodium bismuth niobate tantalate zirconate ferrite ceramics with different contents of $Nb^{5+}$.

FIG. 6 shows that $k_p$ also exhibits an evolutionary trend similar to that of $d_{33}$, and reaches the peak value of 0.516 at x=0.01. The tanδ values decrease first, then increase gradually, and reach the minimum value of 0.024 at x=0.01.

Figure 7:
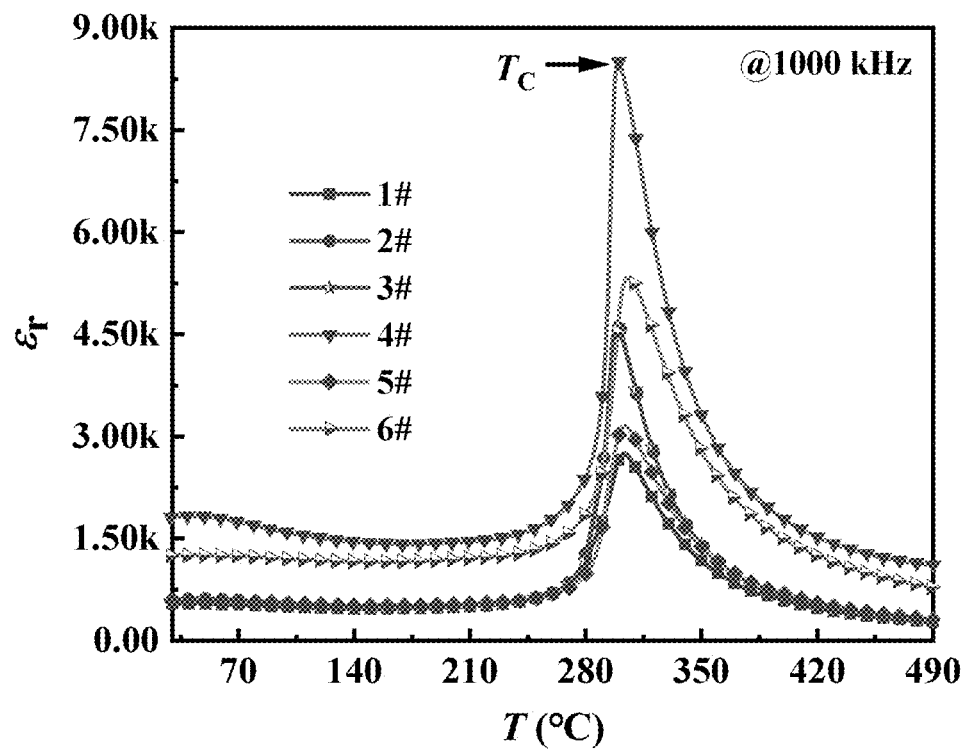
FIG. 7 shows high-temperature dielectric-temperature curves of potassium sodium bismuth niobate tantalate zirconate ferrite ceramics with different contents of $Nb^{5+}$.

FIG. 7 shows the variation of $\varepsilon_r$ with temperature for $(K_{0.45936}Na_{0.51764}Bi_{0.023})$ $(Nb_{0.89958+0.957x}Ta_{0.05742}Zr_{0.04}Fe_{0.003})O_3$ ceramics from room temperature to 500° C. As the measured temperature rises, the sample exhibits a significant phase transition from a ferroelectric tetragonal phase to a paraelectric cubic phase at $T_C$. Interestingly, the $T_C$ values keep unchanged basically with the addition of $Nb^{5+}$.

Figure 8:
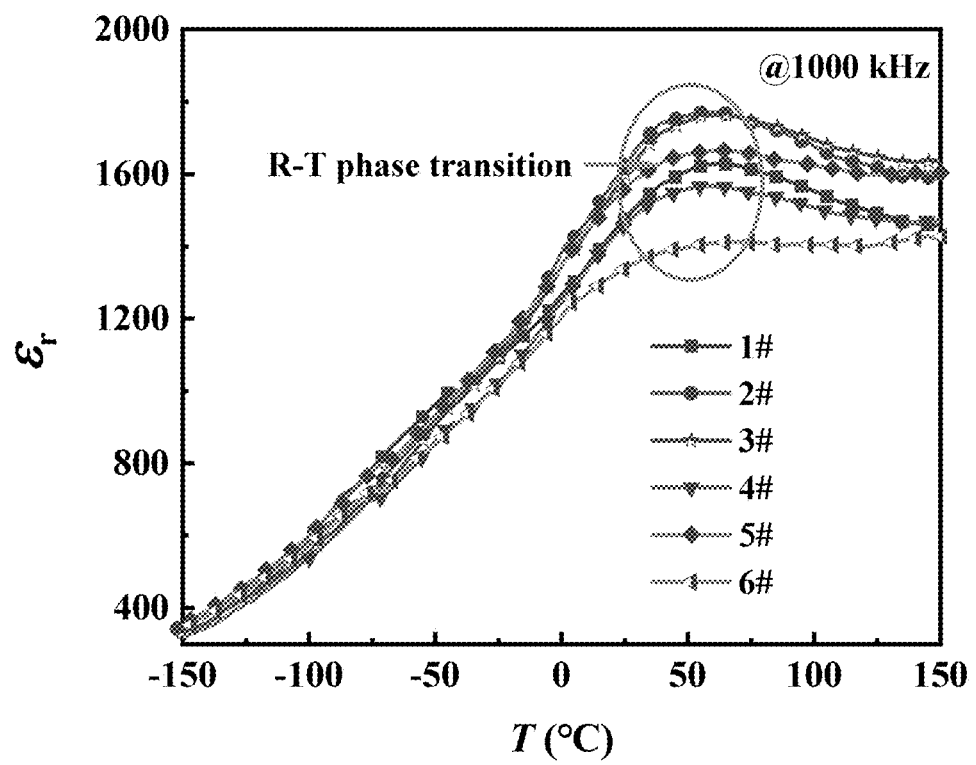
FIG. 8 shows low-temperature dielectric-temperature curves of potassium sodium bismuth niobate tantalate zirconate ferrite ceramics with different contents of $Nb^{5+}$.

Considering that the peak of relative dielectric constant observed at about 60° C. is related to an R-T phase transition, the temperature change observed at this peak indicates the structural transformation of the potassium sodium bismuth niobate tantalate zirconate ferrite ceramics after the addition of $Nb^{5+}$. FIG. 8 depicts the relationship between the $T_{R-T}$ value and the $Nb^{5+}$ content of the ceramics. When x<0.01, $T_{R-T}$ decreases with the increase of the $Nb^{5+}$ content, which can be attributed to the decrease in the values of tolerance factor. However, when x>0.01, $T_{R-T}$ shows an opposite trend with the further increase of x, which is related to the formation of defect dipoles.

Figure 9:
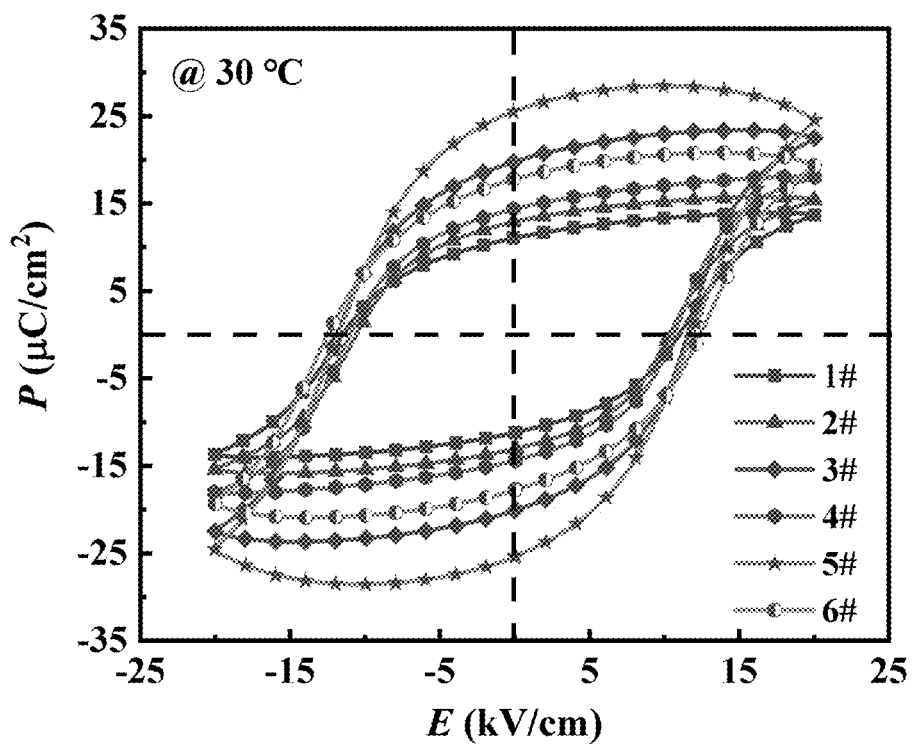
FIG. 9 shows ferroelectric hysteresis loops of potassium sodium bismuth niobate tantalate zirconate ferrite ceramics with different contents of $Nb^{5+}$.

FIG. 9 shows that the $(K_{0.45936}Na_{0.51764}Bi_{0.023})(Nb_{0.89958+0.957x}Ta_{0.05742}Zr_{0.04}Fe_{0.003})O_3$ ceramics has typical P-E loops, which indicates that all samples are ferroelectric. With the increase of $Nb^{5+}$ concentration from −0.01 to 0.02, the remanent polarization ($P_r$) value of the ceramics first increases and then decreases, whereas the $P_r$ values of the $(K_{0.45936}Na_{0.51764}Bi_{0.023})(Nb_{0.89958+0.957x}Ta_{0.05742}Zr_{0.04}Fe_{0.003})O_3$ (x=0.03 and 0.04) ceramics increase abnormally, which can be attributed to the increase of a leakage current. The leakage current in the $(K_{0.45936}Na_{0.51764}Bi_{0.023})(Nb_{0.89958+0.957x}Ta_{0.05742}Zr_{0.04}Fe_{0.003})O_3$ (x=0.03 and 0.04) ceramics may be caused by non-stoichiometry induced mobile charged defects.

Figure 10:
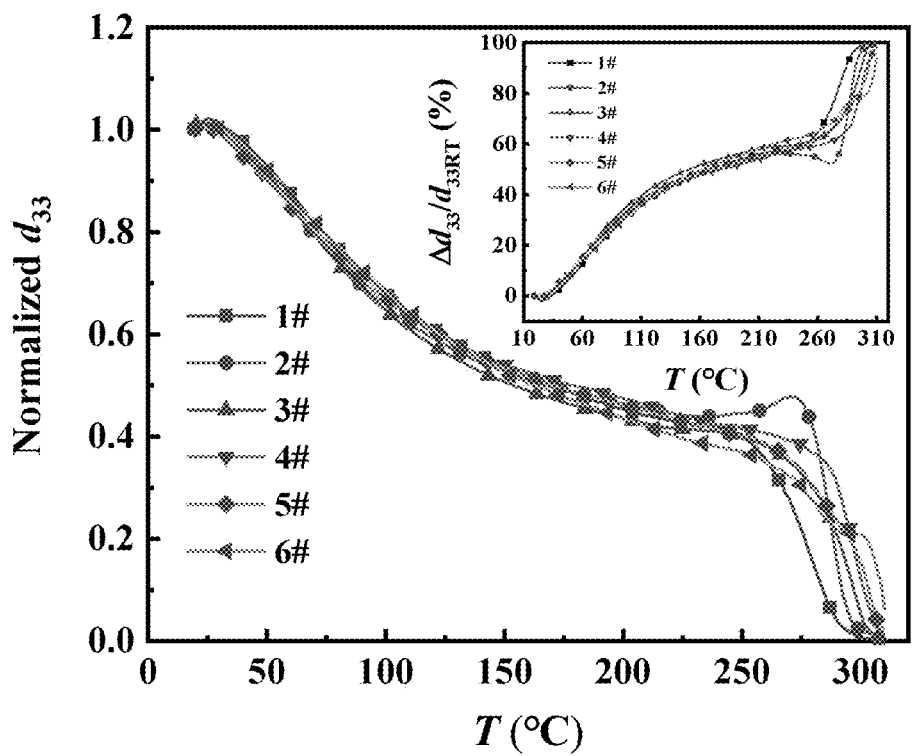
FIG. 10 shows the in-situ temperature stability of $d_{33}$ of potassium sodium bismuth niobate tantalate zirconate ferrite ceramics with different contents of $Nb^{5+}$, and an illustration shows the relationship between $\Delta d_{33}/d_{33RT}$ and temperature.

FIG. 10 shows that the introduction of non-stoichiometric $Nb^{5+}$ leads to the presence of the defect dipoles, and thereby controlling the domain wall pinning effect. Stabilizing domain structure and reducing domain wall mobility may also be conducive to the temperature stability of the $d_{33}$ value.

Therefore, in the potassium sodium bismuth niobate tantalate zirconate ferrite ceramics with non-stoichiometric $Nb^{5+}$ and the preparation method therefor of the present invention using the above structure, B-site is occupied by an excessive amount of $Nb^{5+}$, which significantly affects the microstructure, dielectric properties, ferroelectric properties and piezoelectric properties of the piezoelectric ceramics. In addition, an excessive amount of $Nb^{5+}$ doping improves the temperature stability of the ceramics by providing a domain wall pinning effect. The Curie temperature $T_C$=300° C., the dielectric loss tanδ=0.024, the electromechanical coupling factor $k_p$=0.516, the piezoelectric constant $d_{33}$=450 pC/N and the dielectric constant $\varepsilon_r$=1644 can be simultaneously obtained in $(K_{0.45936}Na_{0.51764}Bi_{0.023})(Nb_{0.90915}Ta_{0.05742}Zr_{0.04}Fe_{0.003})O_3$ ceramics, which makes the potassium sodium bismuth niobate tantalate zirconate ferrite ceramics have a broad application prospect, including in sensors, actuators, and other electronic devices.

Finally, it should be noted that the above embodiments are only used for describing, rather than limiting the technical solution of the present invention. Although the present invention is described in detail concerning the preferred embodiments, those ordinary skilled in the art shall understand that the technical solution of the present invention can still be amended or equivalently replaced. However, these amendments or equivalent replacements shall not enable the amended technical solution to depart from the spirit and the scope of the technical solution of the present invention.

The invention claimed is:

1. A potassium sodium bismuth niobate tantalate zirconate ferrite ceramic with non-stoichiometric $Nb^{5+}$, wherein the ceramics have the following formula:

$(K_{0.45936}Na_{0.51764}Bi_{0.023})$
$(Nb_{0.89958+0.957x}Ta_{0.05742}Zr_{0.04}Fe_{0.003})O_3$, wherein x is 0.01.

2. The potassium sodium bismuth niobate tantalate zirconate ferrite ceramic with non-stoichiometric $Nb^{5+}$ according to claim 1, wherein the ceramic comprises the following piezoelectric properties: a piezoelectric constant $d_{33}$ is 450 pC/N, Curie temperature $T_C$ is 300° C., an electromechanical coupling factor $k_p$ is 0.516, a dielectric constant $\varepsilon_r$ is 1644, and a dielectric loss tanδ is 0.024.

3. A preparation method for the potassium sodium bismuth niobate tantalate zirconate ferrite ceramic with non-stoichiometric $Nb^{5+}$ according to claim 1, comprising the following steps:
    (1) preparing potassium sodium bismuth niobate tantalate zirconate ferrite ceramic powder by a solid phase method comprising
        weighing and proportioning raw materials respectively according to the formula, placing the raw materials in a polyurethane ball milling pot and adding a dispersion medium, placing the raw materials in a planetary ball mill, conducting ball milling until the raw materials are mixed uniformly to form a slurry, placing the uniformly mixed slurry in a stainless steel basin, baking the uniformly mixed slurry under a drying lamp to obtain a dried powder, putting the dried powder into a crucible, raising the temperature in a programmed temperature control box furnace to 850° C.-950° C., and pre-sintering the dried powder for 6 hours to obtain a pre-sintered powder;
    (2) secondary ball milling by
        placing the pre-sintered powder prepared in step (1) in the polyurethane ball milling pot and adding the dispersion medium again, placing the dispersed pre-sintered powder in a planetary ball mill and conducting secondary ball milling to form a second slurry, and baking the second slurry under a drying lamp to obtain a dried ceramic powder;
    (3) granulating and molding by
        fully mixing the dried ceramic powder prepared in step (2) with a 5-10 wt % PVA binder, conducting granulating to form uniformly distributed particles, and pressing the particles into preformed ceramic green pellets with a diameter of 10 mm and a thickness of 1 mm under a uniaxial pressure of 10-15 MPa;
    (4) binder removal and sintering by
        removing binder of the preformed ceramic green pellets prepared in step (3) at a temperature of 500° C.-550° C., and sintering the ceramic green pellets at a temperature of 1090° C.-1120° C. for 3-5 hours to prepare sintered ceramic pellets; and
    (5) silvering and polarization by
        brushing the sintered ceramic pellets with a silver paste with a concentration of 5-15 wt %, sintering the ceramic pellets again at 700° C.-800° C. for 10-15 minutes to prepare a sample, and conducting polarization in an oil bath at a temperature between room temperature and 120° C. to prepare piezoelectric ceramics.

4. The preparation method for the potassium sodium bismuth niobate tantalate zirconate ferrite ceramic with non-stoichiometric $Nb^{5+}$ according to claim 3, wherein the raw materials in step (1) comprise doped elements that are each an oxide or carbonate thereof.

5. The preparation method for the potassium sodium bismuth niobate tantalate zirconate ferrite ceramic with non-stoichiometric $Nb^{5+}$ according to claim 3, wherein during the ball milling in step (1) and step (2), the ratio of powder to zirconium balls is 1:2-3, the ratio of powder to dispersion medium is 1:2-3, the dispersion medium is absolute ethyl alcohol, the ball milling time is 15-20 hours, the rotational speed is 250-320 r/min, and the baking time is 2-3 hours.

6. The preparation method for the potassium sodium bismuth niobate tantalate zirconate ferrite ceramic with non-stoichiometric $Nb^{5+}$ according to claim 3, wherein particle size distribution after the ball milling in step (1) is D50=0.7-0.8 μm, D90=1.7-1.8 μm, and D97=2.2-2.4 μm.

7. The preparation method for the potassium sodium bismuth niobate tantalate zirconate ferrite ceramic with non-stoichiometric $Nb^{5+}$ according to claim 3, wherein particle size distribution after the ball milling in step (2) is D50=0.3-0.4 μm, D90=0.7-0.8 μm, and D97=1.2-1.5 μm.

8. The preparation method for the potassium sodium bismuth niobate tantalate zirconate ferrite ceramic with non-stoichiometric $Nb^{5+}$ according to claim 3, wherein during the polarization in step (5), polarization voltage is gradually increased from a low voltage to a predetermined polarization voltage, polarization field strength is 3-4 kV/mm, and voltage holding time is 10-15 minutes.

\* \* \* \* \*